US006703550B2

(12) United States Patent  
Chu

(10) Patent No.: US 6,703,550 B2
(45) Date of Patent: Mar. 9, 2004

(54) SOUND DATA OUTPUT AND MANIPULATION USING HAPTIC FEEDBACK

(75) Inventor: Lonny L. Chu, Sunnyvale, CA (US)

(73) Assignee: Immersion Corporation, San Jose, CA (US)

(*) Notice: Subject to any disclaimer, the term of this patent is extended or adjusted under 35 U.S.C. 154(b) by 34 days.

(21) Appl. No.: 09/975,320

(22) Filed: Oct. 10, 2001

(65) Prior Publication Data

US 2003/0068053 A1 Apr. 10, 2003

(51) Int. Cl.[7] .......................... A63H 5/00; G04B 13/00; G10H 7/00
(52) U.S. Cl. .......................... 84/609; 345/156; 345/161; 345/163
(58) Field of Search .................. 84/609; 318/568.11, 318/568.25; 345/156, 157, 161, 163, 167, 146, 326, 333; 74/471; 463/30, 37, 38; 434/45; 395/99; 244/233

(56) References Cited

U.S. PATENT DOCUMENTS

| 3,157,853 | A | 11/1964 | Hirsch |
| 3,220,121 | A | 11/1965 | Culter |
| 3,497,668 | A | 2/1970 | Hirsch |
| 3,517,446 | A | 6/1970 | Corlyon et al. |
| 3,623,064 | A | 11/1971 | Kagan |
| 3,902,687 | A | 9/1975 | Hightower |

(List continued on next page.)

FOREIGN PATENT DOCUMENTS

| EP | 0 349 086 A1 | 1/1990 |
| WO | WO 95/02233 | 1/1995 |
| WO | WO02/27705 | 4/2002 |

OTHER PUBLICATIONS

Gillespie, B., "The Touchback Keyboard," Proc. of Int'l Computer Music Conf., Oct. 1992, pp. 447–448.
Gillespie, B., "The Virtual Piano Action: Design and Implementation," Proc. of Int'l Computer Music Conf., Sep. 1994, pp. 167–170.
Snibbe, S. et al., "Haptic Techniques for Media Control," Proc. of 14th Annual Symp. on User Interface Software and Technology, UIST 2001, Nov. 2001, pp. 1–10.
MacLean, K. et al., "An Architecture for Haptic Control of Media," Proc. of ASME Dynamic Systems and Control Division, Haptic Interfaces for Virtual Environments and Teleoperator Systems, 1999, pp. 1–10.
O'Modhrain, M., "Playing by Feel: Incorporating Haptic Feedback into Computer–Based Musical Instruments," Dissertation, Dept. of Music, Stanford University, Nov. 2000, pp. 1–107.
Baigrie, "Electric Control Loading—A Low Cost, High Performance Alternative," *Proceedings of Interservice/Industry Training Systems Conference*, pp. 247–254, Nov. 6–8, 1990.
Iwata, "Pen–based Haptic Virtual Environment," 0–7803–1363–1/93 IEEE, pp. 287–292, 1993.

(List continued on next page.)

*Primary Examiner*—Jeffrey Donels

(57) ABSTRACT

Sound data output and manipulation with haptic feedback. Haptic sensations are associated with sound data to assist in navigating through and editing the sound data. The sound data is loaded into computer memory and played such that sound is output from an audio device. The sound playing is controlled by user input for navigation through the sound data. Haptic commands are generated based on the sound data and are used to output haptic sensations to the user by a haptic feedback device manipulated by the user. The haptic sensations correspond to one or more characteristics of the sound data to assist the user in discerning features of the sound data during the navigation through and editing of the sound data.

29 Claims, 11 Drawing Sheets

U.S. PATENT DOCUMENTS

| | | | |
|---|---|---|---|
| 3,903,614 | A | 9/1975 | Diamond et al. |
| 3,911,416 | A | 10/1975 | Feder |
| 4,160,508 | A | 7/1979 | Salisbury, Jr. |
| 4,236,325 | A | 12/1980 | Hall et al. |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | de Vries et al. |
| 4,713,007 | A | 12/1987 | Alban |
| 4,794,392 | A | 12/1988 | Selinko |
| 4,891,764 | A | 1/1990 | McIntosh |
| 4,930,770 | A | 6/1990 | Baker |
| 4,934,694 | A | 6/1990 | McIntosh |
| 4,937,685 | A | 6/1990 | Barker et al. |
| 5,019,761 | A | 5/1991 | Kraft |
| 5,022,407 | A | 6/1991 | Horch et al. |
| 5,035,242 | A | 7/1991 | Franklin et al. |
| 5,038,089 | A | 8/1991 | Szakaly |
| 5,078,152 | A | 1/1992 | Bond et al. |
| 5,186,629 | A | 2/1993 | Rohen |
| 5,189,355 | A | 2/1993 | Larkins et al. |
| 5,203,563 | A | 4/1993 | Loper, III |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce et al. |
| 5,309,140 | A | 5/1994 | Everett, Jr. et al. |
| 5,334,027 | A | 8/1994 | Wherlock |
| 5,388,992 | A | 2/1995 | Franklin et al. |
| 5,399,091 | A | 3/1995 | Mitsumoto |
| 5,405,152 | A | 4/1995 | Katanics et al. |
| 5,466,213 | A | 11/1995 | Hogan et al. |
| 5,547,382 | A | 8/1996 | Yamasaki et al. |
| 5,565,840 | A | 10/1996 | Thorner et al. |
| 5,619,180 | A | 4/1997 | Massimino et al. |
| 5,669,818 | A | 9/1997 | Thorner et al. |
| 5,684,722 | A | 11/1997 | Thorner et al. |
| 5,766,016 | A | 6/1998 | Sinclair et al. |
| 5,767,457 | A | 6/1998 | Gerpheide et al. |
| 5,785,630 | A | 7/1998 | Bobick et al. |
| 5,795,228 | A | 8/1998 | Trumbull et al. |
| 5,816,823 | A | 10/1998 | Naimark et al. |
| 5,844,392 | A | 12/1998 | Peurach et al. |
| 5,857,986 | A | 1/1999 | Moriyasu |
| 5,889,672 | A | 3/1999 | Schuler et al. |
| 5,959,613 | A | 9/1999 | Rosenberg et al. |
| 5,984,880 | A | 11/1999 | Lander et al. |
| 6,005,551 | A | 12/1999 | Osborne et al. |
| 6,088,017 | A | 7/2000 | Tremblay et al. |
| 6,131,097 | A | 10/2000 | Peurach et al. |
| 6,161,126 | A | 12/2000 | Wies et al. |
| 6,198,206 | B1 | 3/2001 | Saarmaa et al. |
| 6,219,034 | B1 | 4/2001 | Elbing et al. |
| 6,252,583 | B1 | 6/2001 | Braun et al. |
| 6,285,351 | B1 | 9/2001 | Chang et al. |
| 6,292,170 | B1 | 9/2001 | Chang et al. |
| 6,300,936 | B1 | 10/2001 | Braun et al. |

OTHER PUBLICATIONS

Russo, "The Design and Implementation of a Three Degree of Freedom Force Output Joystick," *MIT Libraries Archives* pp.1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Enviromnent Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., "Design and Implementation of a Force Reflecting Manipulandum for Manual Control Research," DSC–vol. 42, *Advances in Robotics*, pp. 1–12, 1992.

Gotow et al., "Controlled Impedance Test Apparatus for Studying Human Interpretation of Kinestetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Fequency Tactile Information to Teleoperators," *Telemanipulator Technology and Space Telerobotics*, Won S. Kim, Editor, Proc. SPIE vol. 2057, pp. 40–50, Sep .7–9, 1993.

Patrick et al., "Design and Testing of A Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990.

Adelstein, "A Virtual Environment System For The Study of Human Arm Tremor," *Ph.D. Dissetation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings Of Fourth CISM–IFToMM*, Sep. 8–12, 1981.

McAffee et al., "Teleoperator Subsystem/Telerobot Demostrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Interventin/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Relating Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System For Dual–Arm Teleoperation," *SOAR '89 Workshop, JSC*, Houston, TX, Jul. 25, 27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987.

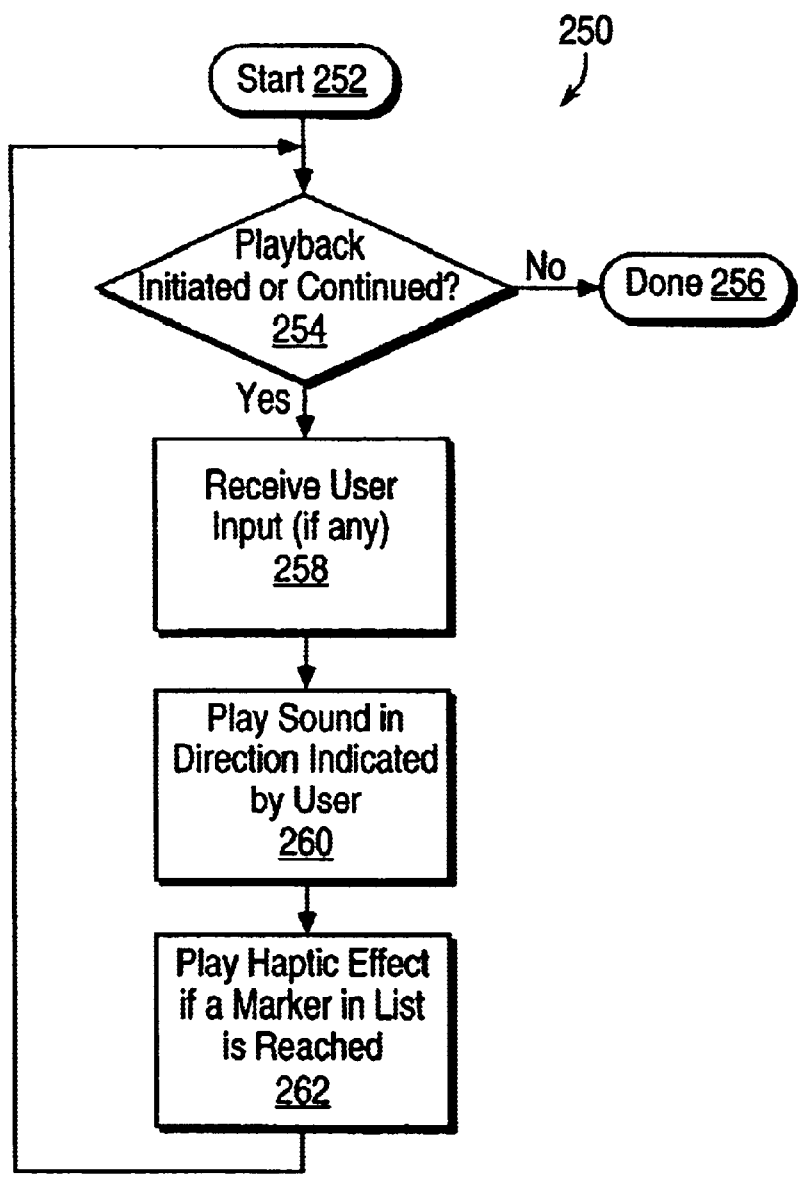

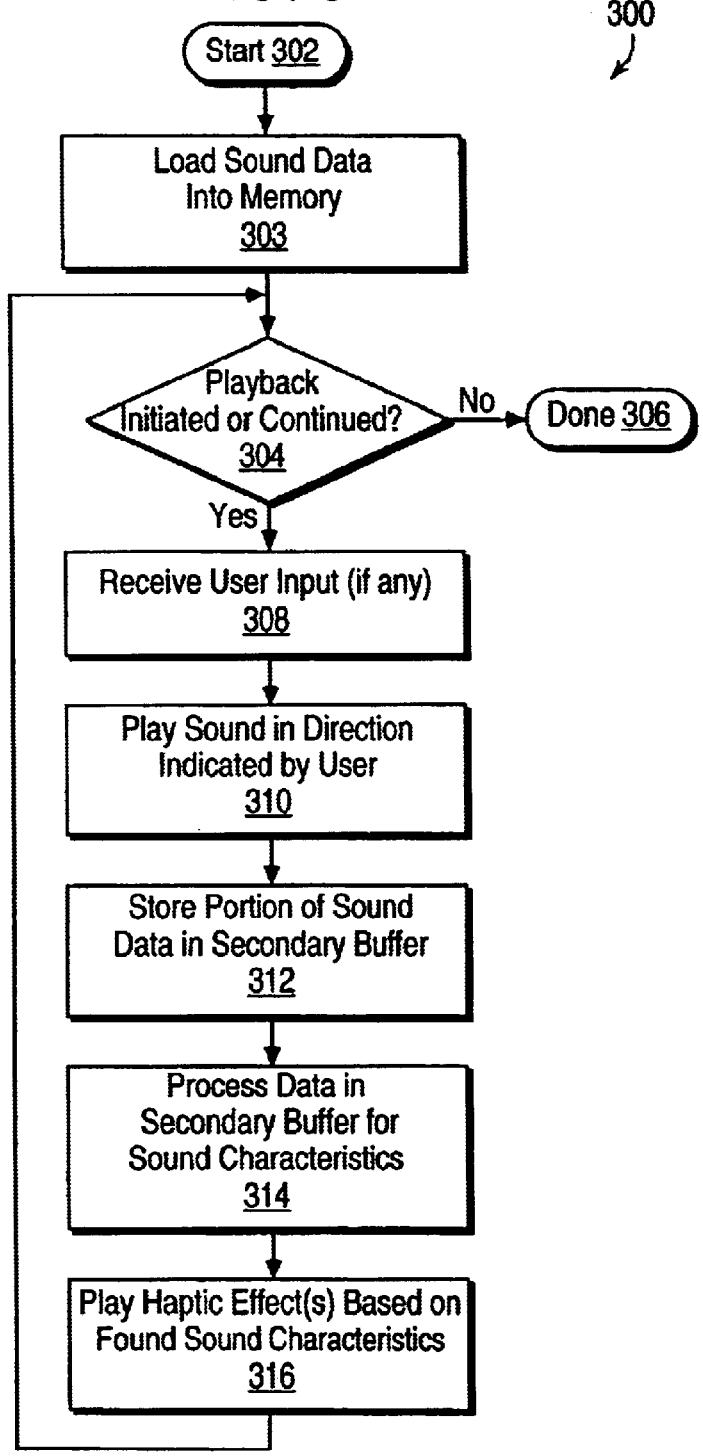

SOUND DATA OUTPUT AND MANIPULATION USING HAPTIC FEEDBACK

BACKGROUND OF THE INVENTION

The present invention relates generally to systems allowing humans to interface with computer systems, and more particularly to methods for providing haptic feedback to the user in computer sound editing and playback environments.

Computers have become widely-used tools in the creation and editing of music and other audio-related data. Digital data representing a musical or other type of auditory composition or recording can be easily created and/or manipulated using available editing software, such as ProTools from Digidesign® and others. A musician can playback any portion of a sound file or sound data, and copy, edit or otherwise manipulate any section of the data using such software. Graphical controls in a graphical user interface, such as sliders, knobs, buttons, pointer or cursor, etc., are typically displayed on a computer screen which the user can manipulate to control sound data playback and editing. A visual representation of the sound data is typically displayed as one or more time vs. amplitude graphs which the user can customize to a desired scale. Some more elaborate systems provide a hardware control such as a jog-shuttle wheel, which is a spring-centered knob which the user can rotate to playback a sound selection in forward or reverse.

However, one of the challenges in contemporary computer-manipulated music is to allow musicians to relate to computers in a way that is conducive to natural and instinctive music composition and editing. Much of the editing and composition process resides in the way people relate to the physical interfaces used to control computers. Traditionally, musicians have learned to work with instruments that directly bind physical manipulation to sound production (e.g., the action of a piano, or a trumpet as a resonator for lip vibrations). However, this type of physical relationship is difficult to reproduce with computers. In most cases today, the interaction with computers occurs through a keyboard and a mouse or, in less frequent circumstances, specialized hardware such as custom-developed electronic musical controllers. These types of interfaces are unidirectional, allowing the musician or other user to send physical input to the computer, but do not allow for the reception of physical feedback.

Current sound editing systems require the musician to use input devices such as keyboards and mice, passive scroll wheels, or passive joysticks while editing sounds. In these cases the musician must rely on auditory and visual feedback. However, the musician or user often performs repetitive editing tasks requiring precision, such as navigating through a musical or speech selection to find particular areas that are to be edited or manipulated. The standard input devices and auditory and visual feedback may sometimes be awkward, inefficient, or insufficiently precise at such navigation and editing tasks, thus causing frustration in the musician's creative efforts.

SUMMARY OF THE INVENTION

The present invention is directed toward outputting haptic sensations in conjunction with the output of audio. Haptic sensations are associated with audio output to allow the user more accurate and efficient control over the playback and editing of sound data.

More particularly, a method of the present invention associates haptic sensations with sound data to assist in navigating through and editing said sound data. At least a portion of sound data is loaded into a memory of a computer, and the sound data is played such that an audio signal is generated and used for outputting sound from an audio device. The playing of the sound is controlled by user input received by the computer from a user for navigation through the sound data. Haptic commands are generated based on the sound data and are used to output haptic sensations to the user by a haptic feedback device manipulated by the user. The haptic sensations correspond to one or more characteristics of the sound data to assist the user in discerning features of the sound data during the navigation through and editing of the sound data.

Preferably, the user can control a speed and/or direction of the playing of the sound data, using rate control or position control paradigms. The haptic sensations can be continuously output during the playing of the sound data and have a magnitude based on an amplitude of the sound data currently being played; or, the haptic sensations can be output only when features of the sound data having predetermined characteristics are played.

One embodiment pre-processes sound data to allow the haptic sensations associated with the sound data to be output when the sound data is played to a user. The sound data in memory is processed to find a sound feature having one or more predetermined characteristics. When a sound characteristic is found, a marker is stored in a list of markers, where the marker indicates a location of the associated sound characteristic in the sound data. The location is to be associated with at least one haptic sensation such that when the sound data is played, the associated haptic sensation is output to a user when the marker is reached during the playing of the sound data.

In another real-time embodiment, a portion of the sound data is stored in a secondary buffer and the portion of the sound data is processed to find the characteristics in the sound data real-time during the playing of the sound data. A visual representation of the sound data and a moving cursor to indicate a current part of the sound data that is being played can be displayed by the computer in any of the embodiments.

The present invention advantageously allows haptic feedback to be experienced by the user as coordinated with sound output. For example, haptic feedback can be integrated into a digital audio editing system to allow the user to feel haptic sensations that are directly related to the playback of the audio data and related to manipulations performed on the audio data. The user can navigate through sound data to find specific points in the data, and the haptic sensations can better inform the user when significant features are played. This greatly assists the user in navigation and editing tasks. This results in better user performance, higher levels of gratification, and an overall improvement in user experience.

These and other advantages of the present invention will become apparent to those skilled in the art upon a reading of the following specification of the invention and a study of the several figures of the drawing.

BRIEF DESCRIPTION OF THE DRAWINGS

FIG. 7 is a flow diagram illustrating a process for playing back pre-processed sound data and haptic sensations in accordance with the present invention;

FIG. 8 is a flow diagram illustrating a real-time playback process of outputting haptic sensations in accordance with sound playback according to the present invention;

DETAILED DESCRIPTION OF PREFERRED EMBODIMENTS

Figure 1:
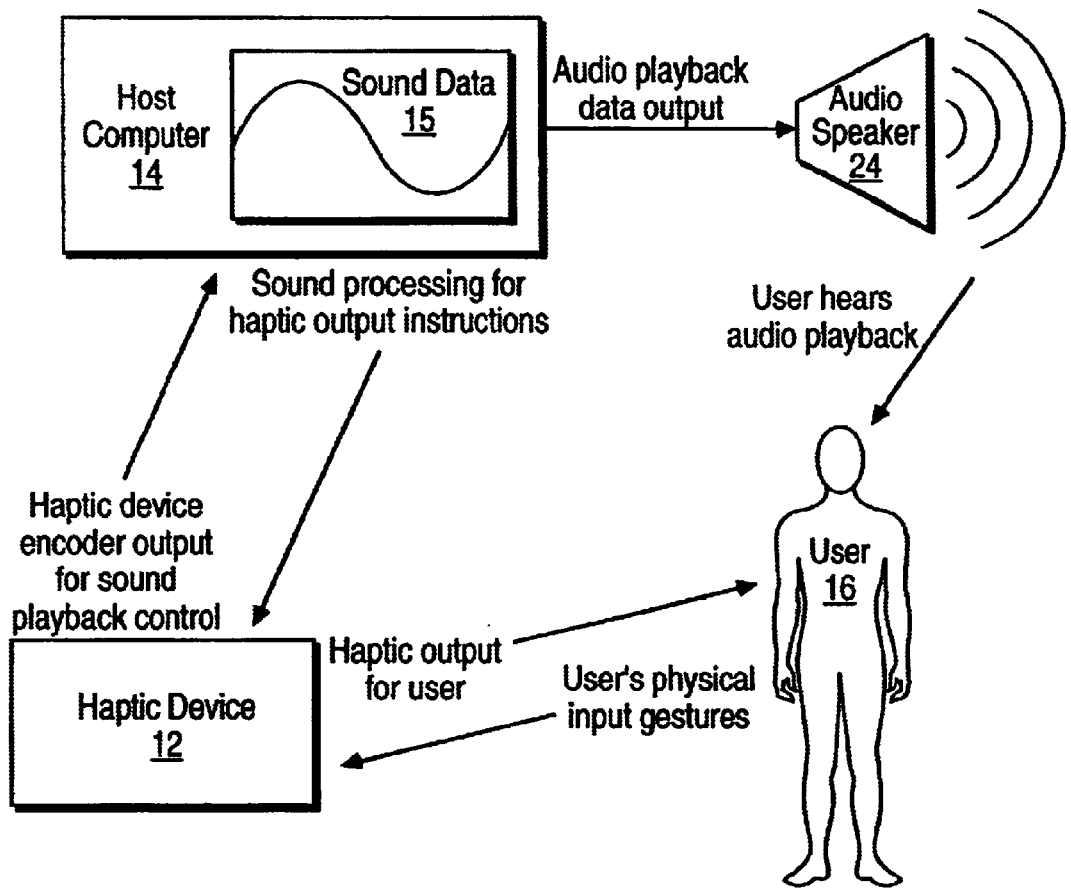
FIG. 1 is a block diagram illustrating a system for providing sound data manipulation capabilities for the user enhanced with haptic feedback.

FIG. 1 is a block diagram illustrating a system 10 for providing sound data manipulation capabilities for the user enhanced with haptic feedback. A host computer 14 runs a sound data manipulation application program that allows a user 16 to manipulate sound data 15 by inputting commands to the host computer. To input these commands, the user 16 manipulates a haptic feedback interface device 12. Haptic feedback interface devices allow the user to input commands and data and also provide kinesthetic force feedback or tactile feedback to the user, more generally known herein as "haptic feedback." Using motors or other types of actuators, these interface devices can provide physical sensations which are felt by the user contacting the device or manipulating a user manipulandum of the device. For example, the device 12 can be a knob, a mouse, a trackball, a joystick, or other device which the user moves in provided degrees of freedom to input direction, value, magnitude, etc. While the user physically contacts the device 12 to provide input, he or she also can experience haptic sensations output by the haptic device 12. In the present invention, the haptic sensations are related to the editing and other sound manipulation features occurring in the application program of the host computer and allow the user to more easily perform the manipulation tasks and work with the sound data.

The host computer 14 also outputs signals to the audio speakers 24 to allow the user 16 to hear sound data that the user has selected to be played. The output of the sound data from the speakers, coordinated with a visual display of the host computer and the output of haptic sensations from the haptic device 12 allows the user to experience and note particular or preselected events in the sound data more easily. This allows the user to edit sound more easily by discerning such events through the sense of touch in addition to auditory and visual senses.

A haptic feedback device can handle input and output to a computer interface. This is very powerful for real-time tasks in which quick and efficient human physical reactions are critical to success. Haptic feedback interfaces can improve user efficiency and accuracy while decreasing the cognitive load required to accomplish computer tasks. These types of results can be greatly beneficial to music creation and editing since one of the critical characteristics of an effective musical interface is that it allow the user to become immersed in the musical experience without being overly conscious of specific physical gestures. The present invention allows inexpensive haptic devices to be integrated into computer-assisted musical and sound editing and creation.

Figure 2:
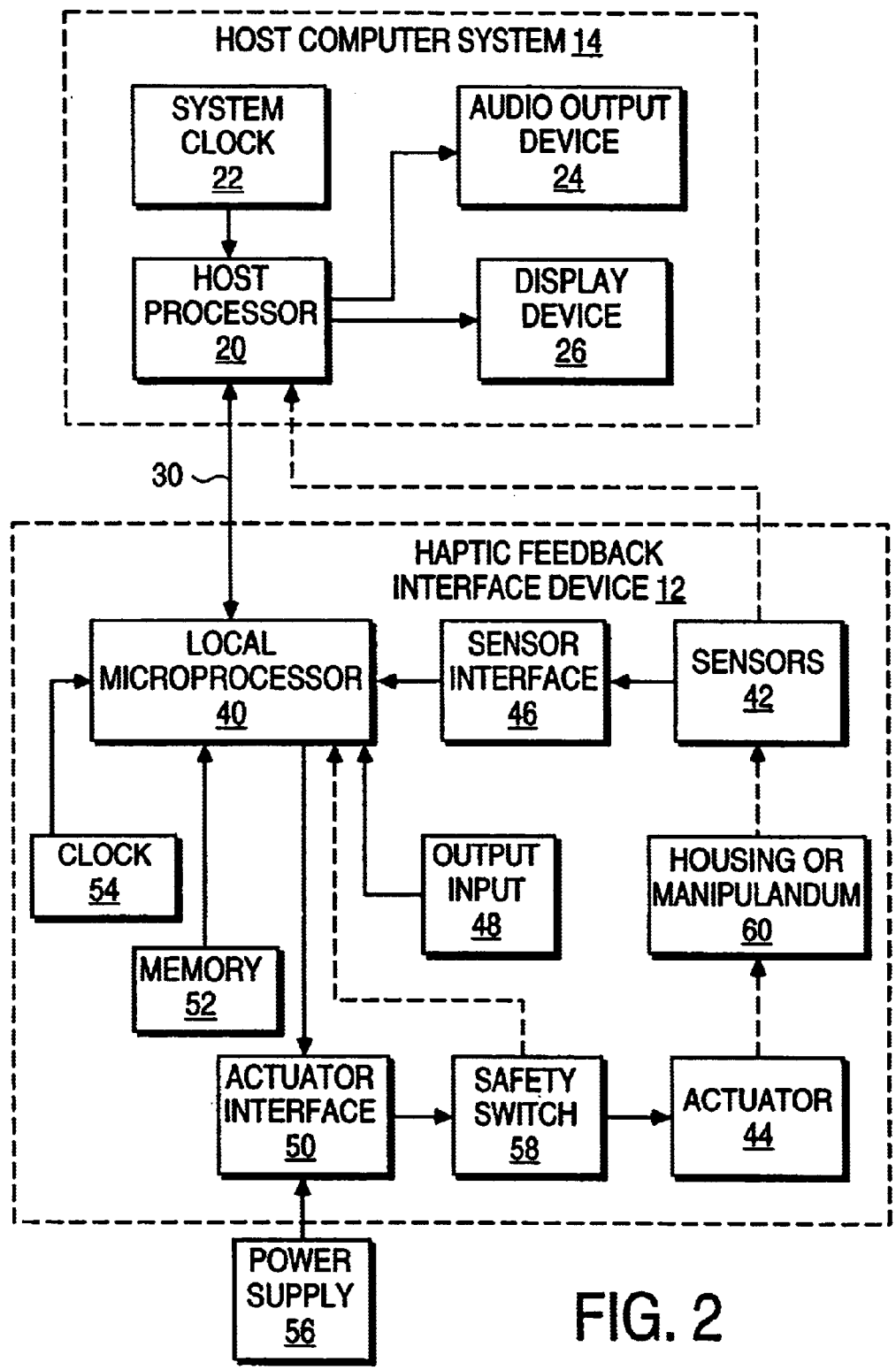
FIG. 2 is a block diagram illustrating one embodiment of the haptic feedback system of FIG. 1 including a haptic feedback interface device in communication with a host computer.

FIG. 2 is a block diagram illustrating one embodiment of the haptic feedback system of FIG. 1 including haptic feedback interface device 12 in communication with a host computer 14.

Host computer 14 preferably includes a host microprocessor 20, a clock 22, a display screen 26, and an audio output device 24. The host computer also includes other well known components, such as random access memory (RAM), read-only memory (ROM), and input/output (I/O) electronics (not shown). The host computer 14 is a computing device that can take a wide variety of forms. For example, in the described embodiments computer 14 is a personal computer or workstation, such as a PC compatible computer or Macintosh personal computer, or a Sun or Silicon Graphics workstation. Such a computer 14 can operate under the Windows™, MacOS™, Unix, MS-DOS, or other operating system. Alternatively, host computer 14 can be one of a variety of home video game console systems commonly connected to a television set or other display, such as systems available from Nintendo, Sega, Sony, or Microsoft. In other embodiments, host computer system 14 can be a "set top box", a "network-" or "internet-computer", a portable computer or game device, a consumer electronics device (stereo component, etc.), PDA, etc.

Host computer 14 preferably implements a host application program with which a user is interacting via device 12 and other peripherals, if appropriate. In the context of the present invention, the host application program is a digital audio editing program, as described in greater detail below. Other application programs that utilize input of device 12 and output haptic feedback commands to the device 12 can also be used. The host application program preferably utilizes a graphical user interface (GUI) to present options to a user and receive input from the user. This application program may include the haptic feedback functionality described below; or, the haptic feedback control can be implemented in another program running on the host computer, such as a driver or other application program. Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. Suitable software drivers which interface software with haptic feedback devices are available from Immersion Corporation of San Jose, Calif.

Display device 26 can be included in host computer system 14 and can be a standard display screen (LCD, CRT, flat panel, etc.), 3-D goggles, projection device, or any other visual output device. Display device 26 displays images as commanded by an operating system application, simulation, game, etc. Audio output device 24, such as speakers, provides sound output to user. In the context of the present invention, other audio-related devices may also be coupled to the host computer, such as mixers, amplifiers, specialized hardware, etc. Other types of peripherals can also be coupled to host processor 20, such as storage devices (hard disk drive, CD ROM drive, floppy disk drive, etc.), printers, and other input and output devices.

The interface device 12, such as a mouse, knob, gamepad, trackball, joystick, remote control, etc., is coupled to host computer system 14 by a bi-directional bus 30. The bi-directional bus sends signals in either direction between host computer system 14 and the interface device. Bus 30 can be a serial interface bus, such as an RS232 serial interface, RS-422, Universal Serial Bus (USB), MIDI, or other protocols well known to those skilled in the art; or a parallel bus or wireless link. Some interfaces can also provide power to the actuators of the device 12.

Device 12 can include a local processor 40. Local processor 40 can optionally be included within the housing of device 12 to allow efficient communication with other components of the mouse. Processor 40 can be provided with software instructions to wait for commands or requests from computer host 14, decode the command or request, and handle/control input and output signals according to the command or request. In addition, processor 40 can operate independently of host computer 14 by reading sensor signals and calculating appropriate forces from those sensor signals, time signals, and stored or relayed instructions selected in accordance with a host command. Suitable microprocessors for use as local processor 40 include the MC68HC711E9 by Motorola, the PIC16C74 by Microchip, and the 82930AX by Intel Corp., for example, as well as more sophisticated force feedback processors such as the Immersion Touchsense Processor. Processor 40 can include one microprocessor chip, multiple processors and/or co-processor chips, and/or digital signal processor (DSP) capability.

Microprocessor 40 can receive signals from sensor(s) 42 and provide signals to actuator assembly 44 in accordance with instructions provided by host computer 14 over bus 30. For example, in a local control embodiment, host computer 14 provides high level supervisory commands to processor 40 over bus 30, and processor 40 decodes the commands and manages low level force control loops to sensors and the actuator in accordance with the high level commands and independently of the host computer 14. This operation is described in greater detail in U.S. Pat. Nos. 5,739,811 and 5,734,373, both incorporated herein by reference. In the host control loop, force commands from the host computer instruct the processor to output a force or force sensation having specified characteristics. The local processor 40 reports locative and other sensor data to the host computer which the host computer uses to update executed programs. In the local control loop, actuator signals are provided from the processor 40 to actuator 44 and sensor signals are provided from the sensor 42 and other input devices 48 to the processor 40. The processor 40 can process inputted sensor signals to determine appropriate output actuator signals by following stored instructions. Herein, the term "haptic sensation" or "tactile sensation" refers to either a single force or a sequence of forces output by the actuator assemblies which provide a sensation to the user.

In yet other embodiments, other simpler hardware can be provided locally to device 12 to provide functionality as processor 40. For example, a hardware state machine or ASIC incorporating fixed logic can be used to provide signals to the actuator 44 and receive sensor signals from sensors 42, and to output tactile signals according to a predefined sequence, algorithm, or process.

In a different, host-controlled embodiment, host computer 14 can provide low-level force commands over bus 30, which are directly transmitted to the actuator 44 via processor 40. Host computer 14 thus directly controls and processes all signals to and from the device 12. In the simple host control embodiment, the signal from the host to the device can command the actuator to output a force at a predefined frequency and magnitude, or can include a magnitude and/or a direction, or be a simple command that indicates a desired force value to apply over time.

Local memory 52, such as RAM and/or ROM, is preferably coupled to processor 40 in device 12 to store instructions for processor 40 and store temporary and other data. For example, force profiles can be stored in memory 52, such as a sequence of stored force values that can be output by the processor, or a look-up table of force values to be output based on the current position of the user object. In addition, a local clock 54 can be coupled to the processor 40 to provide timing data, similar to the system clock of host computer 14; the timing data might be required, for example, to compute forces output by actuator 44 (e.g., forces dependent on calculated velocities or other time dependent factors). In embodiments using the USB communication interface, timing data for processor 40 can be alternatively retrieved from the USB signal.

Sensors 42 sense the position or motion of the device and/or one or more manipulandums or controls and provides signals to processor 40 (or host 14) including information representative of the position or motion. Sensors suitable for detecting manipulation include digital optical encoders, optical sensor systems, linear optical encoders, potentiometers, optical sensors, velocity sensors, acceleration sensors, strain gauge, or other types of sensors can also be used, and either relative or absolute sensors can be provided. Optional sensor interface 46 can be used to convert sensor signals to signals that can be interpreted by the processor 40 and/or host 14.

Actuator(s) 44 transmit forces to the housing or one or more manipulandums 60 of the device 12 in response to signals received from processor 40 and/or host computer 14. Actuator 44 can be any of many types of actuators, including active actuators such as DC motors, voice coils, pneumatic or hydraulic actuators, torquers, piezoelectric actuators, moving magnet actuators, etc., or passive actuators such as brakes.

Actuator interface 50 can be optionally connected between actuator 44 and processor 40 to convert signals from processor 40 into signals appropriate to drive actuator 44. Interface 50 can include power amplifiers, switches, digital to analog controllers (DACs), analog to digital controllers (ADCs), and other components, as is well known to those skilled in the art. Other input devices 48 are included in device 12 and send input signals to processor 40 or to host 14 when manipulated by the user. Such input devices can include buttons, scroll wheels, d-pads, dials, switches, or other controls or mechanisms.

Power supply 56 can optionally be included in device 12 coupled to actuator interface 50 and/or actuator 44 to provide electrical power to the actuator, or be provided as a separate component. Alternatively, power can be drawn from a power supply separate from device 12, or be received across the bus 30. Also, received power can be stored and regulated by device 12 and thus used when needed to drive actuator 44 or used in a supplementary fashion. Some embodiments can use a power storage device in the device to ensure that peak forces can be applied (as described in U.S. Pat. No. 5,929,607, incorporated herein by reference). Alternatively, this technology can be employed in a wireless device, in which case battery power is used to drive the tactile actuators. A safety switch 58 can optionally be included to allow a user to deactivate actuator 44 for safety reasons.

The actuators 44 output forces on a housing and/or manipulandum(s) 60 of the interface device 12. The sensors 42 can sense the position or motion of the housing or manipulandum 60. Many types of interface or control devices may be used with the present invention described herein. For example, such interface devices can include a haptic feedback trackball, joystick handle, steering wheel, knob, handheld remote control device, gamepad controller for video games or computer games, stylus, grip, wheel, button, cellular phone, PDA, touchpad, or other manipulatable object, surface, or housing.

Figure 3:
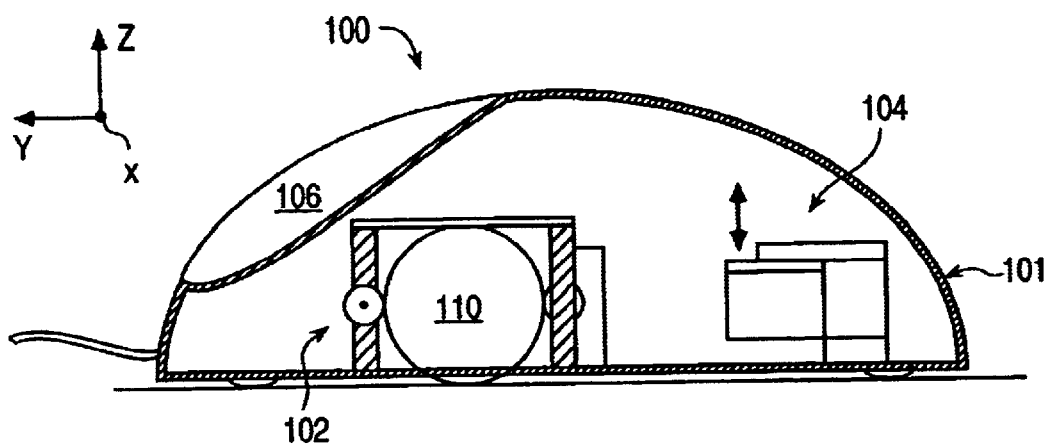
FIG. 3 is a side cross-sectional view of a mouse embodiment of the haptic feedback device suitable for use with the present invention.

FIG. 3 is a side cross-sectional view of a mouse embodiment 100 of device 12 suitable for use with the present invention.

Mouse device 100 includes a housing 101, a sensing system 102, and an actuator 104. Housing 101 is shaped to fit the user's hand like a standard mouse while the user moves the mouse in the planar degrees of freedom and manipulates the buttons 106. Other housing shapes can be provided in many different embodiments.

Sensor 102 detects the position of the mouse in its planar degrees of freedom, e.g. along the X and Y axes. In the described embodiment, sensor 102 includes a standard mouse ball 110 for providing directional input to the computer system. Alternatively, an optical sensor or other type of sensor can be used.

Mouse device 100 includes one or more actuators 104 for imparting haptic feedback such as tactile sensations to the user of the mouse. Actuator 104 is coupled to the housing 101 to provide haptic feedback to the user. In one embodiment, the actuator is coupled to an inertial mass that is moved by the actuator. Inertial forces caused by the motion of the inertial mass are applied to the housing of the mouse with respect to the inertial mass, thereby conveying haptic feedback such as tactile sensations to the user of the mouse who is contacting the housing. Some embodiments allow the actuator to move itself as the inertial mass. Such embodiments are described in greater detail in U.S. Pat. No. 6,211,861 and U.S. application Ser. No. 09/585,741, both incorporated herein by reference in their entireties. Other types of interface devices, such as gamepads, handheld remote controls, cellular phones, PDA's, etc., can include such an actuator for inertial tactile sensations.

Other types of interface devices and actuators can also be used with the present invention. For example, gamepads, mice, or other devices can include an eccentric rotating mass coupled to a rotating shaft of an actuator to provide inertial tactile sensations on the housing or manipulandum of the device. Other types of haptic devices can provide kinesthetic force feedback, such as joysticks, knobs, scroll wheels, gamepads, steering wheels, trackballs, mice, etc., in which forces are output in the sensed degree(s) of freedom of a manipulandum. For example, embodiments of a kinesthetic mouse haptic device are disclosed in U.S. Pat. Nos. 6,100,874 and 6,166,723, both incorporated herein by reference in their entireties.

Figure 4:
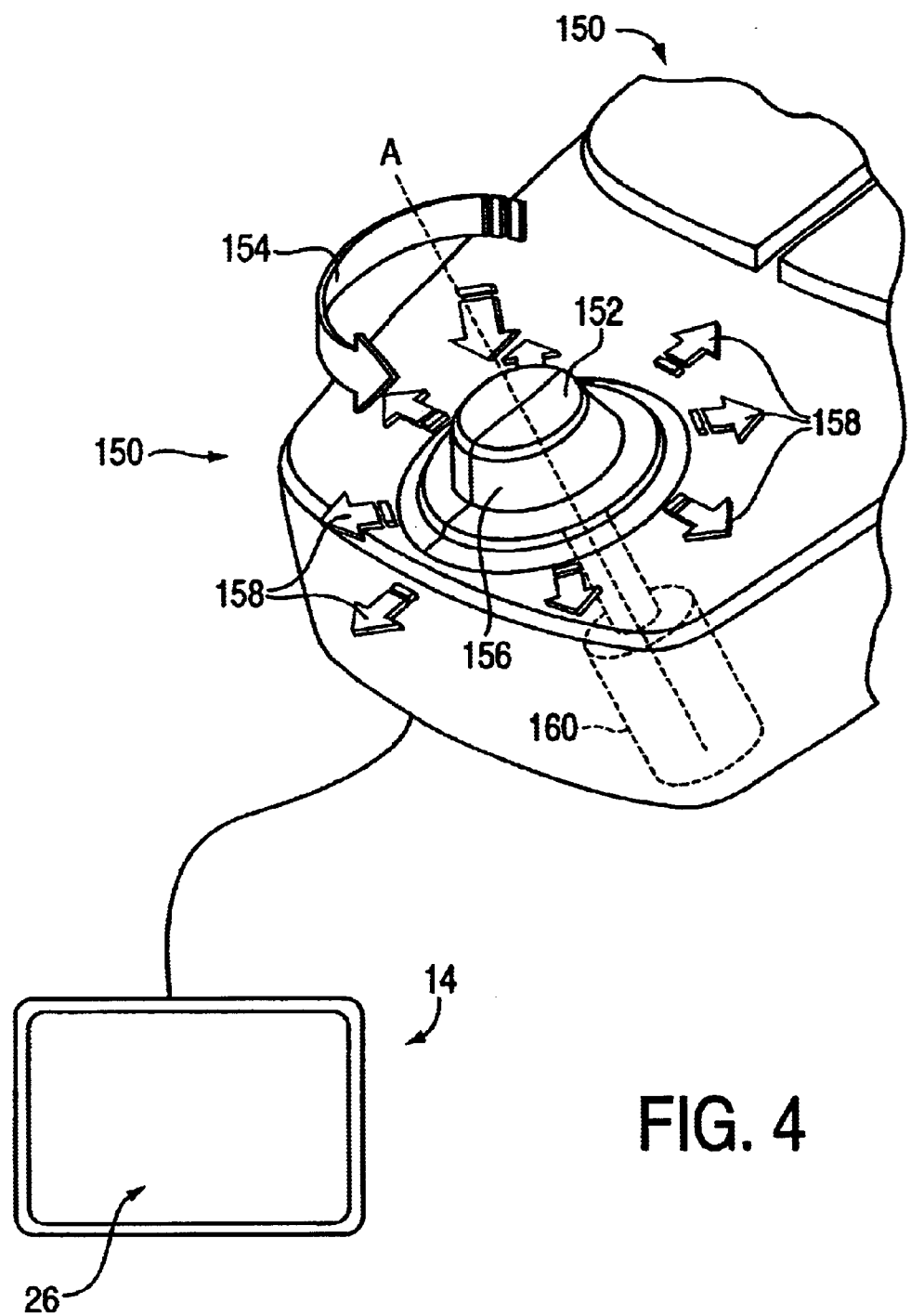
FIG. 4 is a perspective view of another embodiment 150 of interface device 12 suitable for use with the present invention.

FIG. 4 is a perspective view of another embodiment 150 of interface device 12 suitable for use with the present invention. Knob device 150 includes a control knob 152 that is manipulated by the user to control various functions of the electronic device or host computer 14. For example, the knob device can be provided in a separate housing unit that is connected to the host computer 14 running editing software as described below, or can be provided in an entire control panel including other controls related to audio editing or other control functions as desired. Display 26 of the host computer 14 (or a display dedicated to the knob device) can display the editing controls as described below.

Control knob 152 allows the user to directly manipulate functions and settings of the present invention. Knob 152 can be an approximately cylindrical object engageable by the user. In the described embodiment, knob 152 rotates in a single rotary degree of freedom about an axis extending out of the knob, such as axis A, as shown by arrow 154. The user preferably grips or contacts the circumferential surface 156 of the knob 152 and rotates it a desired amount. Multiple knobs 152 can be provided in alternate embodiments, each knob providing different or similar control functionality.

Furthermore, some embodiments of the control knob 152 may allow additional control functionality for the user. The control knob 152 is preferably able to be pushed and/or pulled in a degree of freedom along axis A (or approximately parallel to axis A) and this motion is sensed by an axial switch or sensor. This provides the user with additional ways to select functions or settings without having to remove his or her grip from the knob. For example, in one embodiment, the user can move a displayed cursor or other indicator on the display 14 using the rotation of the knob 152; when the cursor has been moved to a desired setting or area on the display, the user can push the knob 152 to select the desired setting. The push and/or pull functionality of the knob 152 can be provided with a spring return bias, or can be implemented to remain at a pushed or pulled position until the user actively moves the knob to a new position.

In other embodiments, the knob 152 may be able to be moved by the user in one or more transverse or lateral directions in a plane approximately perpendicular (orthogonal) to the axis A of rotation. This transverse motion is indicated by arrows 158. For example, the knob 152 can be moved in the four orthogonal and four diagonal directions shown. This transverse motion of knob 152 can allow the user to select additional settings or functions of the controlled device, such as mode selection, cursor positioning, or value or magnitude setting.

The knob 152 is preferably provided with force feedback in at least the rotary degree of freedom of the knob. An actuator 160 can be provided, such as a rotary DC motor, having a shaft coupled to the knob 152. The actuator can output forces to provide detents, springs, damping, barriers, or other force sensations to the knob in its rotation. A sensor for reading the knob's rotary position can be integrated with the actuator or separately provided. Alternatively or additionally, the transverse and/or linear axial motions of the knob can be actuated. Knob hardware implementations are described in greater detail in U.S. Pat. No. 6,154,201, incorporated herein by reference. Some force sensations are described in U.S. Pat. Nos. 5,734,373 and 6,154,201, incorporated herein by reference in their entireties.

SOUND DATA OUTPUT AND MANIPULATION WITH HAPTIC FEEDBACK

The present invention improves the user experience in the manipulation of digital sound data (also referred to as "audio data") through the use of haptic sensations output by a haptic feedback interface device.

Figure 5:
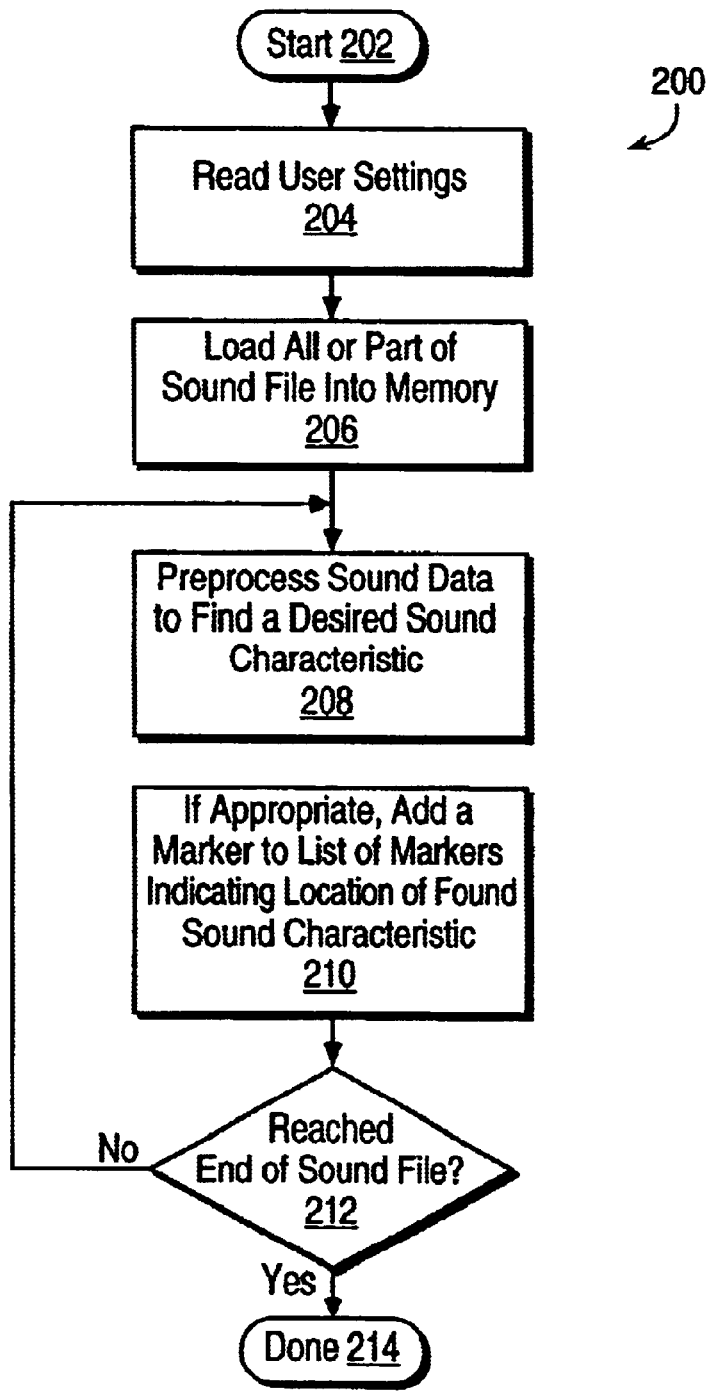
FIG. 5 is a flow diagram of a method for pre-processing sound data in accordance with the present invention.

FIG. 5 is a flow diagram of one pre-processing embodiment 200 of the present invention. This method can be implemented by an application program, such as a sound composition/editing program, which is the example used in the described embodiment. Alternatively, the method can be implemented using a separate application program or driver program that is running simultaneously with a sound composition/editing program. Other types of application programs can also be used with the present invention.

The method starts at 202, and in step 204, any settings made by the user are read in. For example, the user may have previously entered settings in fields displayed in a graphical user interface; examples of such a user interface are described below with reference to FIGS. 10 and 11. The settings allow the user to customize the feel of the haptic sensations and their relation to the sound that is played or edited. User settings can also be input in other ways, e.g. by a program that reads a database, via a networked storage device, etc.

In next step 206, all or part of the sound file or sound data, or a file that includes sound data among other data, is loaded into memory. The sound data typically consists of a sequence of individual digital sound samples that instruct a driver or other I/O program or device how to generate an audio signal from the samples, as is well known in the art. This sound data will be pre-processed by the method of the present invention to allow haptic sensations to be output when the sound data is later played to the user by speakers or other audio output device. If the method of the present invention is being performed by a separate program than the sound editing or playback program, then the separate program can load the sound data into memory for preprocessing.

In next step 208, the sound data loaded into memory is pre-processed to find a desired sound characteristic that is to be associated with a haptic sensation. For example, the method can examine the sound file in the manner that the sound file would be played or output by a playback device, e.g. in temporal sequence, or other sequences in other embodiments.

The desired sound characteristics that are being searched can vary in different embodiments and may be influenced by the user settings read in step 204. In one embodiment, the method can look for extreme rises of amplitude in the sound data. This is diagrammed in the waveform diagram 220 of FIG. 6. The sound data represents a sound waveform 222 and may have short peaks 224 of sound corresponding to short or abrupt features in the sound, such as drumbeats or other percussion sounds in music. The rise in amplitude at the first peak 224, for example, can be a characteristic that is searched for in step 208. Preferably, a minimum threshold rise in amplitude is imposed. For example, a predetermined percentage larger than a mean amplitude of the sound waveform can be the threshold, e.g. 50%. The mean amplitude of the sound data can be computed beforehand for the entire amount of sound data loaded in memory in step 206. The percentage value for the threshold can be a user setting loaded in step 204 or can be a default value.

The method can use more elaborate methods as well, including error correction so that, for example, noise is not detected as a desired sound characteristic. For example, to identify a feature as a peak in the sound data that should be assigned a haptic sensation, the method can require, after a rise, that the sound waveform drop some percentage below the mean value at that point in the sound data for the feature to register as a peak in the sound data. If the waveform does not have this drop, then the drop in amplitude found can be considered a false drop, e.g. noise, so that the true drop in amplitude may occur later in the waveform. This check reduces the chance of falsely finding multiple peaks when there is only one desired peak and noise that caused minor drops in amplitude.

Other error correction measures can be undertaken to prevent some sound features from being overcounted as desirable haptic features. For example, if the method comes across a peak in the sound data, the method can examine the most previous sound peak found in the sound data. If the currently-found peak is not separated from the previous peak by a predetermined minimum time interval, then the current peak should not be counted as a desired haptic sound characteristic. This prevents haptic sensations being assigned to sound characteristics that are so close together in time during playback that the user cannot distinguish them, and thus saves processing time. Other comparisons between a current sound characteristic and previously found characteristic(s) can be made in other embodiments to determine whether or not to consider the current characteristic as assignable to a haptic sensation. Other characteristics in the sound data can also be searched for, such as a predetermined number of oscillations, drops of a predetermined percentage in altitude, etc.

Once a sound characteristic has been found in the sound data, in next step 210, a marker is added to a running list of markers which indicates the location of the found sound characteristic. The marker can simply be a number indicating the number of the sound sample (e.g., referenced from the beginning of the sound data) at which the found characteristic starts, or at some other standardized location of the characteristic. For example, a marker is represented by dashed line 226 in FIG. 6 at the start of peak 224; the identification number (or other identifier) of the sound sample at the location of line 226 can be stored in the marker list.

The list of markers includes all the desired sound characteristics found in previous iterations of the present method which will correspond with haptic sensations, e.g. if a sequential processing is implemented, characteristics for haptic association occurring earlier in the sound data stream. The list is organized so that during playback, sound samples in the list can be readily compared with a sound sample currently being played.

Some embodiments can simply provide a marker in the list, and all of the markers are associated with a standard haptic sensation, such as a detent. Thus, whenever a marker is reached during playback, a detent will be output to the user. In other more complex embodiments, each marker can be associated with a type of haptic sensation based on the type or characteristics of the sound characteristic found. For example, an indication of the associated haptic sensation (its type and/or parameters) can be stored in the marker list with each marker. In other embodiments, a marker can be placed at every sound sample or every few sound samples, and a force value is computed in association with each marker to be proportional to the sound amplitude at that sample. This allows a haptic output to continuously match the amplitude of the sound data. However, such continuous matching is better implemented in a real-time processing embodiment as described below with reference to FIG. 8.

In next step 212, it is checked whether the end of the sound file or sound data has been reached and no more data need be pre-processed. If this is not the case, then the method returns to step 208 to preprocess the sound data further until another desired sound characteristic is found. If no further sound data need be pre-processed, then the method is complete at 214.

FIG. 7 is a flow diagram illustrating a method 250 for playing back pre-processed sound data and haptic sensations in accordance with the present invention. In this method, it is assumed that the user or an application program is outputting sound to the user via speakers or other audio device. In one embodiment, to which the present example method is chiefly relevant, the application program is a music composition/editing program that allows the user to playback music based on input from the user via the haptic device 12. For example, the user can manipulate a knob device to playback sound by turning the knob in one direction to play the sound forward, and turning the knob in the opposite direction to play the sound backward. Or a user may use a mouse, joystick, or other device. A user often performs this forward and backward playback to hear sound samples that the user has just edited or composed using the application program, and may also use this feature to position a cursor at a desired location in the sound data stream for further editing of the sound data.

The method starts at 252, and in step 254, the method checks if sound playback is initiated or continued. If not, the method is complete at 256. If so, then in step 258, user input can be received, such as the user turning a knob or other manipulandum of the haptic device to a new position. Or, no new input may be provided by the user. In step 260, the sound data is played through the speakers in the direction indicated by the user, either forward or backward. The direction can correspond to the direction of rotation of a knob, the direction of motion of a mouse or joystick or wheel, etc.

Some embodiments can provide a rate control mode, where the user may control the speed of sound playback. Playback rate is based on the current position of a manipulandum or object from a reference position. For example, in a knob embodiment, the further the user has rotated the knob from an origin resting position, the greater is the speed of sound playback. In some embodiments, the user also has a spring resistance on the knob to aid in this rate control. Other embodiments may provide a position control mode, where music is played only when a user manipulandum is moving, where a particular amount of movement corresponds to a particular amount or duration of music playback. For example, in a position control mode, the user can rotate a knob continually clockwise to continue to hear music playback, and can adjust the speed of that rotation to adjust the speed of playback. When the user stops rotating the knob, the sound playback stops. The mode can also determine what haptic sensations are output; for example, time-based pops or jolts may be appropriate in a rate control mode, while position-based detents or springs can be output in position control mode.

Figure 6:
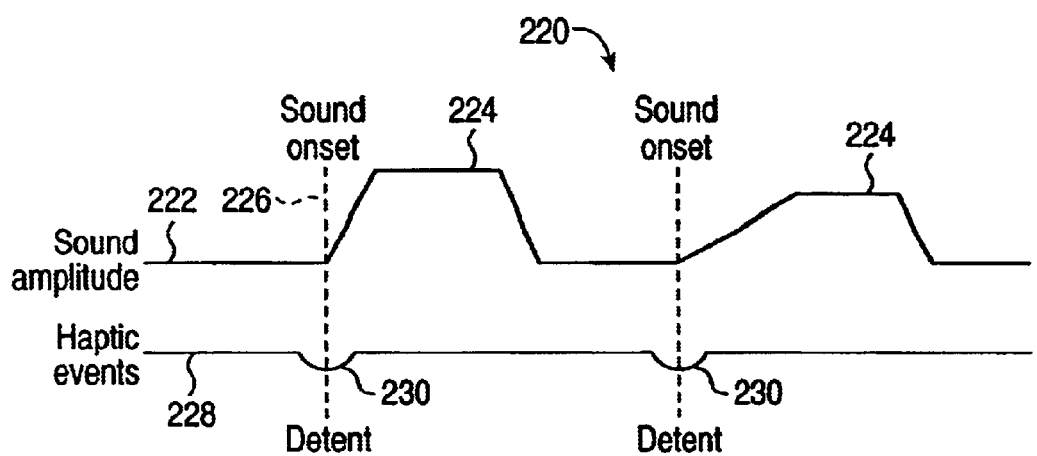
FIG. 6 is a diagrammatic illustration of a sound waveform and haptic sensations correlated with the sound waveform.

In next step 262, the method plays a haptic effect if a marker in the sound data has been reached. The markers were preferably placed in a list based on pre-processing of FIG. 5, and each marker has an associated sound sample or location in the sound data. When that sound sample or location is reached during playback, then the haptic effect associated with that marker is commanded to be output. For example, as shown in FIG. 6, haptic sensations are designated by line 228. When marker 226 is reached during playback, the associated haptic sensation is output, which is a force detent in the present example, indicated by a dip 230 in the line 228. As described above, some embodiments may store a type of haptic sensation with the particular marker that has been reached, allowing a variety of different haptic sensations to be output.

A haptic sensation is thus immediately output by the haptic device to the user simultaneously with output of the associated sound feature. For example, a drum beat sound that is output is simultaneously coordinated with the output of a force pulse or jolt from the haptic device to the user. The method then returns to step 254 to check if playback is continued; if so, the sound is played and haptic effects played when markers are reached in similar fashion.

Some embodiments can vary the output haptic sensations based on other factors, such as user input. For example, the haptic sensations may be based on the speed of sound playback as controlled by the user. In one embodiment, the magnitude of the detents or other haptic sensations can be directly proportional to the speed of playback or based on the current playback speed in relation to a predetermined threshold velocity.

Besides music, other sounds such as speech can be played back, e.g. audio only or dialogue in a film. Haptic sensations can thus be based on speech properties in the sound data. Some programs can segment speech properties, such as pauses between or within sentences or phrasing within sentences and words, to allow the user to edit sound data representing speech output.

The present invention thus provides haptic sensations correlated with the output of features in the sound data. The user can navigate through sound data to find specific points in the serial data, and the haptic sensations can better inform the user when significant features such as peaks are scrolled by or located at a cursor or pointer provided by the application program. This greatly assists the user in navigation and editing tasks.

FIG. 8 is a flow diagram illustrating a real-time playback process 300 of outputting haptic sensations in accordance with sound playback according to the present invention. In contrast to the methods of FIGS. 5 and 7, in which sound data is pre-processed for characteristics to be mapped to haptic sensations before actual sound playback, in the present method the sound data is processed during playback, thus saving any pre-processing time and calculation.

The method begins at 302, and in step 303, sound data is loaded into memory (a primary buffer). As above, this can be a sound file to be played, or a file that includes sound data among other data (e.g. visual data) to be played. In step 304, the method checks if sound playback is initiated or continued. If not, the method is complete at 306. If so, then in step 308, user input can be received, such as the user turning a knob or other manipulandum of the haptic device to a new position, similarly as described above for FIG. 7. In step 310, the sound data is played through the speakers in the direction indicated by the user, similarly as described for the method of FIG. 7. A rate control mode, position control mode, or other control paradigm can be used. For playback, the playback program (such as a music editing program) may provide a "playback pointer" that indicates the current sound sample being played or which sample in the sound data will be played next, where the pointer is simply moved along the sound samples as they are output.

In next step 312, a portion of sound data near the playback pointer is stored in a secondary buffer. For example, this can be a predetermined amount of sound data that is to be played right after the playback pointer's current location, such as 100 millisecond's worth of sound. In step 314, the data in the secondary sound buffer is processed and analyzed for sound characteristics. This step can be similar to the processing step 208 of FIG. 5, where features in the sound data are found which are desired to be associated with haptic sensations. For example, a rise and/or fall in amplitude can be examined. All the user preferences or settings can be used in helping determine if a sound characteristic is present which is to be mapped to a haptic sensation, and the particular haptic sensation that is to be mapped. In other embodiments, such as where haptic sensation magnitude continuously follows sound amplitude (see FIGS. 9a and 9b), no specific features of the sound may need to be found.

Figure 9A:
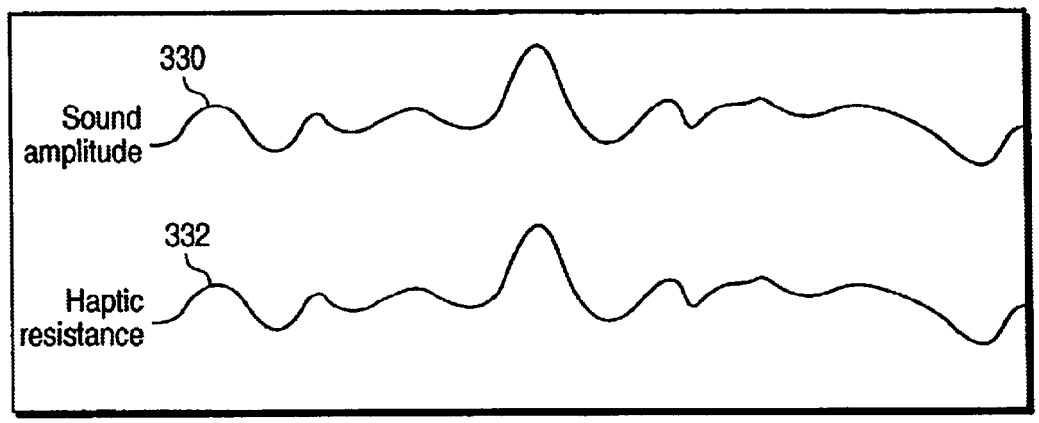
FIGS. 9a and 9b are diagrammatic illustrations showing sound and haptic waveforms in basic time vs. amplitude form for continuous haptic output in direct and inverse outputs, respectively.
Figure 9B:
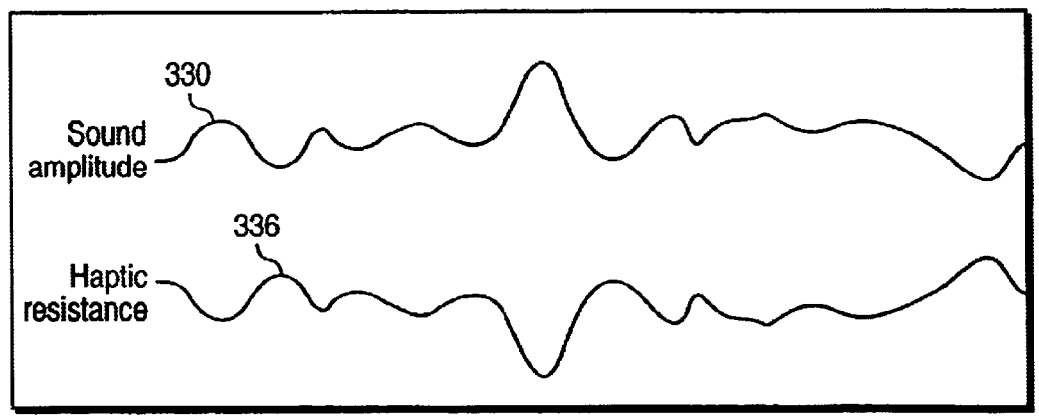

In next step 316, haptic effects are sent to the haptic device to be played based on the sound characteristics found in step 314. For example, if a rise in sound amplitude has been found, a detent sensation can be output, similarly as if the method had found a marker in the preprocessing method of FIG. 7. Alternatively, a haptic sensation can be output having a magnitude that is continuously based on the sound amplitude. For example, FIG. 9a is a diagrammatic illustration showing two waveforms 330 and 332 in basic time vs. amplitude form. Waveform 330 represents the sound amplitude of the sound data over time. In the present real-time processing embodiment, the method can compute an amplitude for the haptic sensation, represented by waveform 332, which is continuously proportional to the sound amplitude of the sound data in the secondary buffer. For example, a resistance can be output on a manipulandum, such as a knob, where the magnitude of resistance corresponds to the current sound amplitude and varies with the sound amplitude. In FIG. 9b, sound waveform amplitude 330 is similarly shown, but the haptic sensation amplitude 336 can be continuously inversely varied from the sound amplitude to provide a different haptic experience to the user. Other continuous haptic sensation mappings or sound characteristic haptic mappings can also be used.

Preferably, after the sound characteristics have been found and haptic sensations mapped and commanded to be output, the haptic sensations will be felt by the user at approximately about the time that the sound samples corresponding to the haptic sensations are played by speakers. Once the haptic effect(s) are played for the found sound characteristics, the method returns to step 304 to check if sound playback is continued.

Figure 10:
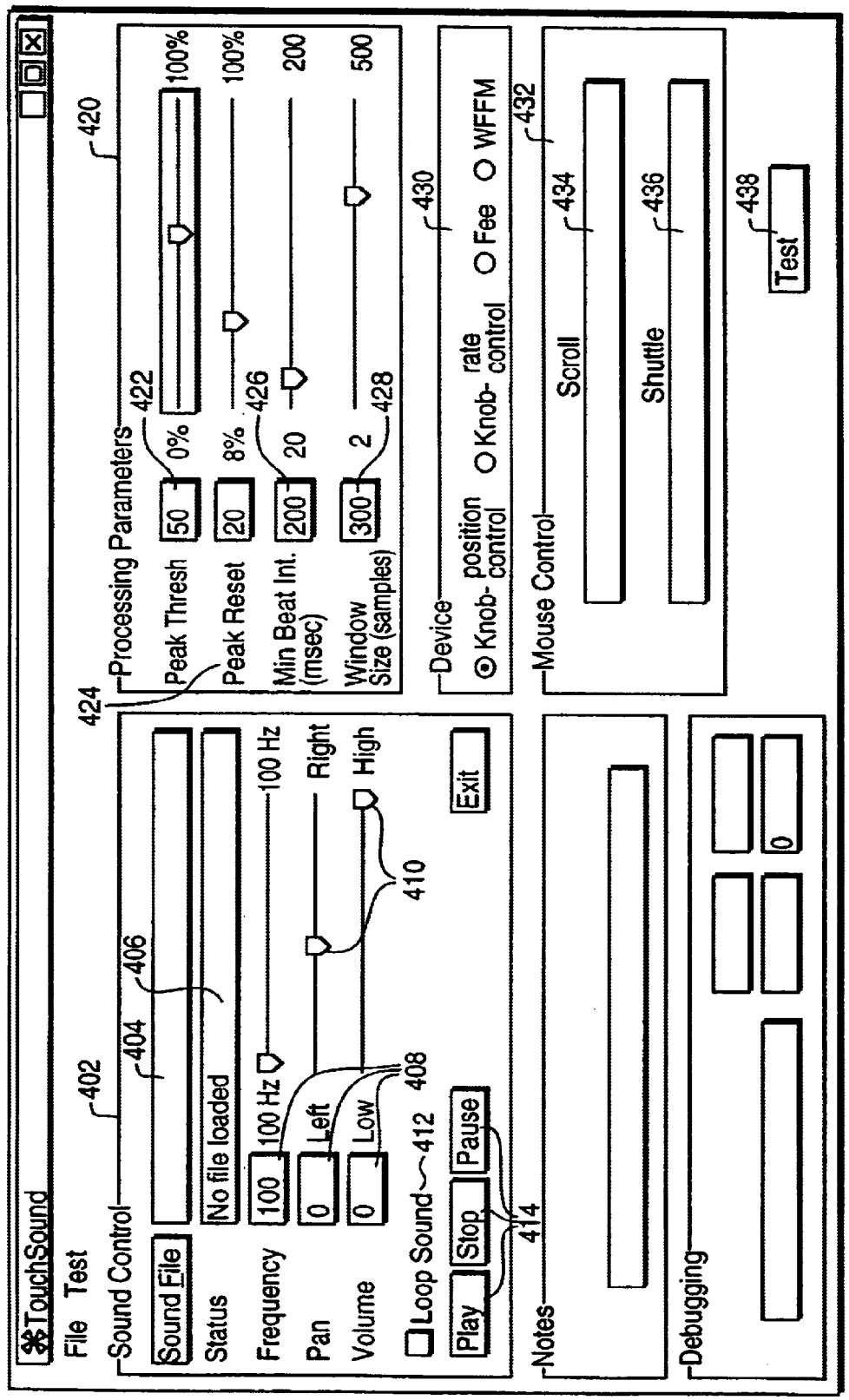
FIG. 10 is a diagrammatic illustration of a graphical user interface which can allow the user to input preferences and settings as well as control sound playback for the present invention.

FIG. 10 is a diagrammatic illustration of a graphical user interface 400 which can allow the user to input preferences and settings for the present invention as well as control sound playback in simple ways to test the user settings. For example, these settings can be incorporated into an application program such as a sound/music editing program, or can be used in a separate test program.

Sound control parameters 402 can include a sound file field 404, which allows the user to select a desired sound file to playback including the sound data to which haptic sensations will be correlated. The sound file can be loaded entirely into memory, and in some embodiments a reversed version of the file can be loaded into a second buffer to allow reverse playback. Status field 406 can display the current status of the program, such as opening the file, processing the sound data, creating a reverse buffer for reverse playback, etc. Playback adjustment fields 408 allow the user to enter values to customize the playback of the sound data, and include a frequency field to adjust the speed of playback (where the normal frequency of playback for that file can be automatically initially set), a pan field to adjust the balance of playback between left and right speakers, and a volume field to adjust output amplitude of the sound. Slider bars 410 can also be used to input these user settings. A loop sound box 412 allows the user to select whether the sound file will repeat playback or stop when reaching the end of the data in the sound file. Buttons 414 allow the user to start, stop, or pause playback of the sound file.

Processing parameters 420 allow a user to adjust the parameters that influence the way the haptic sensations are generated based on sound data. Peak threshold parameter 422 can be used to designate the amount of rise in the sound signal, compared to the average sound level, that will trigger a haptic event, as explained above. The parameter can be designated as a percentage of the mean sound amplitude, e.g. a rise of 50% of the mean amplitude or greater will be a significant enough rise to allow a haptic sensation to be associated with that rise. The peak reset parameter 424 allows the user to specify the percentage drop in sound amplitude (compared to the mean sound amplitude), after a detected rise, that will be deemed significant enough to be a peak in sound amplitude and warrant a haptic sensation, and to prevent finding false multiple peaks as explained above. The minimum beat interval parameter 426 is another error checking parameter that allows the user to specify a time interval (e.g. in milliseconds) that is the minimum interval that must be present between two peaks for the second peak to be counted; otherwise the second peak is considered a false peak caused by noise, as described above. The window size parameter 428 allows the user to specify the window size, in number of sound samples, which defines the resolution used in averaging the sound data amplitude; the method can average the samples in each window and then average all the windows together to find a mean sound amplitude.

Device selections 430 allow the user to select what type of haptic device 12 is currently being used in the system and by which the haptic sensations are to be output. Different devices may require different commands to output the haptic sensations. A knob device having position control or rate control, a tactile feedback mouse, and a kinesthetic feedback mouse are shown as options, but any haptic device can be used. The mouse control fields 432 allow the user to control the sound playback using a mouse cursor, and can be used to test the sound playback and haptic sensation output as modified by the user's preferences and settings. For example, shuttle field 436 allows the user to move a cursor within the shuttle field to play back the sound file in a position control mode. While the cursor is moving left or right in the shuttle field 436 and a button is held down, music is played back at a rate proportional to the speed of the cursor; movement to the right causes forward playback, and movement to the left causes reverse playback. Scroll field 434 allows the user to move a cursor within the field to play back the sound file in a rate control mode. The user places or moves the cursor to affect the direction and rate of playback. The position of the cursor to the right of the middle point of the field 434 causes forward playback at a rate proportional to the distance between the cursor and the middle point, and a position of the cursor to the left of the middle point similarly causes proportional reverse playback.

Test button 438 allows the user, in the pre-processing embodiment described for FIG. 5, to initiate the reprocessing of the sound data in memory if the processing parameters or device selections have been changed.

Figure 11:
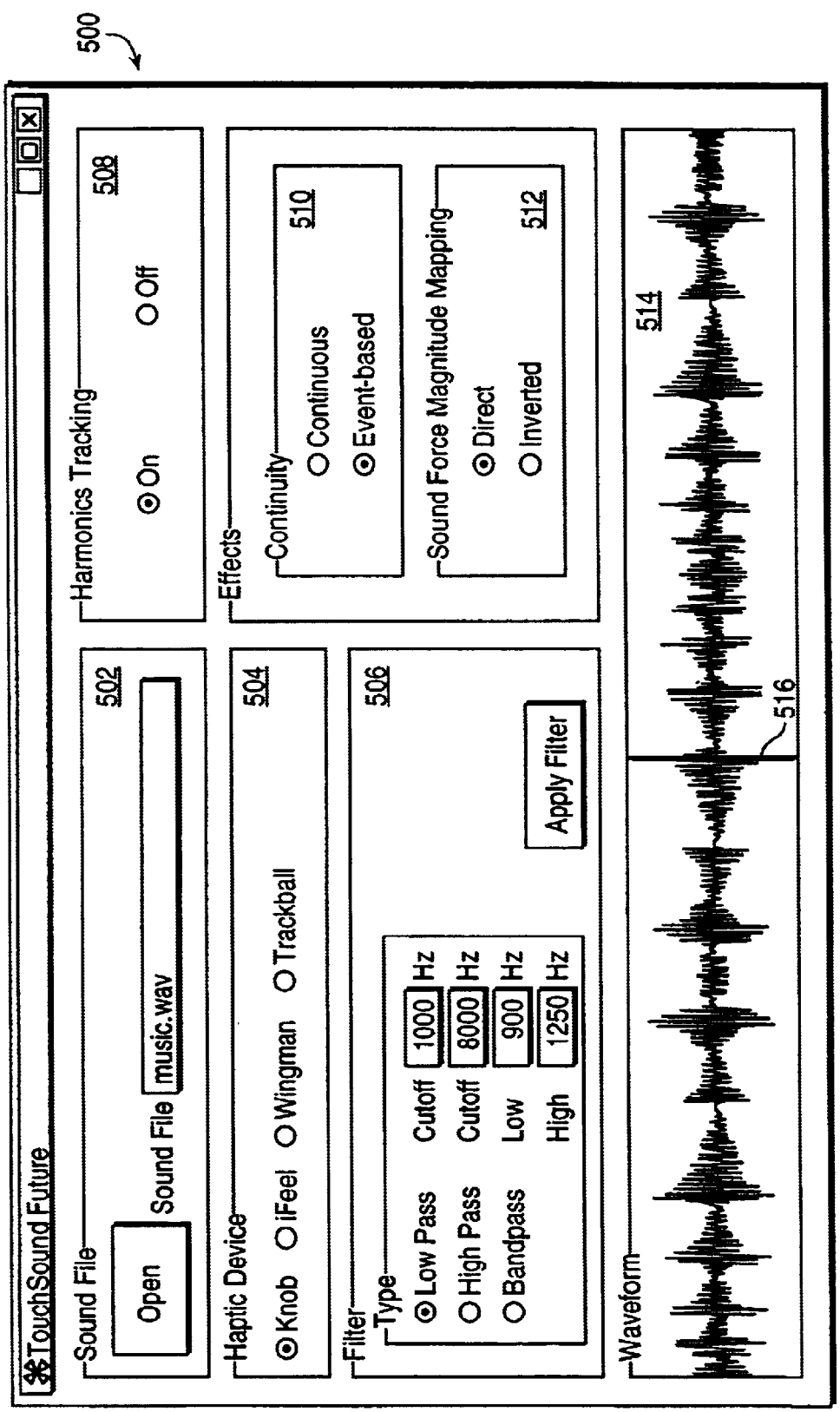
FIG. 11 is a diagrammatic illustration of another graphical user interface which can allow the user to input preferences and settings for the present invention.

FIG. 11 is a diagrammatic illustration of another graphical user interface 500 which can allow the user to input additional preferences and settings for the present invention. Any or all of these settings can be included with some or all of the settings of FIG. 10, if desired, in a single interface. Sound file field 502 allows the user to specify a sound file, and haptic device settings 504 allow the user to select a type of haptic device.

Filters 506 allow the user to customize frequency ranges for filters that can be used in some embodiments of the present invention in the sound data processing steps of the methods of FIG. 5 or FIG. 8. A low-pass filter, a high-pass filter, and/or a bandpass filter may be used to isolate different frequency ranges of the sound data to which haptic sensations can be applied. The user can set the cutoff and range limits to these filters, where the low pass filter removes frequencies above the user-designated cutoff, the high pass filter removes frequencies below the user-designated cutoff, and the bandpass filter removes frequencies outside the user-designated frequency range.

Since different types of sound rely on different frequency ranges, filters can be useful for sound editing tasks. For example, the meaningful information in speech typically resides in higher frequencies, so a user editing speech may want to apply a high pass filter so that only the pertinent frequencies are present. Desired features of the speech are then more easily found in these pertinent frequencies. Similarly, music that is dependent on heavy and strong beats or rhythms (e.g., rock and roll, dance music, rap) carry much information in low frequencies while much classical music focuses on high and mid-range frequencies; the appropriate filters can be used on the style of music played to isolate the meaningful frequency range. The filters can also be useful when editing individual instrument sounds in the sound data since the frequency content may be controlled to match the characteristics of the instrument.

Harmonic tracking setting 508 can be set by the user as on or off. The harmonic tracking feature, if set to be on, can create a mapping of haptic sensations (e.g., texture or vibrations) to the harmonic content, or timbre, of the sound. A haptic texture is a pattern of short haptic features, such as detents or jolts, spaced or organized in a predetermined way, and which are output as the user manipulandum of the haptic device is moved over each "bump" location (e.g., detent, jolt, etc.) of the texture field. A haptic texture can be related to the timbre of the output sound. For example, a clean, simple haptic texture having "bumps" spaced further apart can be output haptically while pure tones are being output as sound. In contrast, complex and dense textures having closely-spaced bumps can be output haptically when complex tones of sound are being output. The sound of a flute is a rather pure tone and can be mapped to a very light and simple haptic texture, or even no texture at all. At the other end of the spectrum, the sound of an electric guitar distortion is a very complex tone and can be mapped to heavier, complex haptic textures. Textures are more appropriate for position control modes; in rate control modes, vibrations can be similarly output, with low frequency vibrations corresponding to far-spaced textures and high frequency vibrations corresponding to closely-spaced textures.

Effects settings allow the user to adjust how some of the haptic sensations will feel. Continuity setting 510 allows the user to select whether the haptic output continuously changes or is event-based. If "continuous" is selected, then the haptic output changes in real-time as the sound properties change, as described above with reference to FIGS. 9a and 9b. This might be selected if the user wanted to continually track the amplitude of the sound during navigation. If "event-based" is selected, then only significant events in the sound data, such as the rise in amplitude discussed above with respect to FIG. 6, trigger haptic events. For example, a beat, an amplitude peak, can trigger a haptic detent. In other embodiments, the user can select an option allowing both continuous haptic output and event-based haptic output, e.g. a continuous resistance supplemented with jolts or detents overlaid on the resistance force.

The sound to force magnitude mapping setting 512 allows the user to select how the haptic output response is output. For example, when direct mapping is selected, greater sound amplitude generates greater magnitude haptic forces, as described above with reference to FIG. 9a. When inverted mapping is selected, greater sound amplitude generates weaker magnitude haptic forces, as described above with reference to FIG. 9b. This mapping can apply to the continuous setting of the continuity setting 510, or the event-based setting (e.g., inverse detents can be output).

Waveform 514 is a graphical representation of a waveform representing the sound data loaded into memory. The waveform can be displayed, for example, as the user navigates through the sound data. The entire sound data file can be represented as the waveform, or a section of the sound data can be represented. A cursor 516 is, in the example shown, a vertical bar that signifies the current playback position in the waveform. During navigation and playback of the sound, the cursor 516 moves in the direction corresponding to playback direction and moves at the rate of playback (alternatively, the entire waveform can be scrolled and the cursor remain stationary). The user can thus visually sense when the cursor moves over features in the sound and feel the haptic sensations corresponding to those features. In those pre-processing embodiments storing markers to indicate sound characteristics which have been mapped to haptic sensations (see FIG. 5), the markers can also be displayed at their locations with respect to the waveform.

The present invention can be used for standalone sound files, such as those used for music or speech, and which can be in one of many standardized formats (wav, mp3, MIDI, etc.). In addition, the present invention can be used for sound data that may be included with other data describing visual presentations, such as video, film, and animations.

While this invention has been described in terms of several preferred embodiments, it is contemplated that alterations, permutations and equivalents thereof will become apparent to those skilled in the art upon a reading of the specification and study of the drawings. For example, many different embodiments of haptic feedback devices can be used to output the haptic sensations described herein. Furthermore, certain terminology has been used for the purposes of descriptive clarity, and not to limit the present invention.

What is claimed is:

1. A method for associating haptic sensations with sound data to assist in navigating through and editing said sound data, the method comprising:

loading at least a portion of said sound data into a memory of a computer;

playing said sound data such that an audio signal is generated and used for outputting sound from an audio device, wherein said playing of said sound is controlled by user input received by said computer from a user for navigation through said sound data; and generating haptic commands based on said sound data, said haptic commands used to output haptic sensations to said user by a haptic feedback device manipulated by said user and in communication with said computer, said haptic sensations corresponding to one or more characteristics of said sound data to assist said user in discerning features of said sound data during said navigation through and editing of said sound data.

2. A method as recited in claim 1 wherein said user can control a speed of said playing of said sound data.

3. A method as recited in claim 1 wherein said user can control a direction of said playing of said sound data, said direction including forward and reverse.

4. A method as recited in claim 1 wherein said haptic sensations are continuously output during said playing of said sound data, and wherein an output haptic sensation has a magnitude based on an amplitude of said sound data currently being played.

5. A method as recited in claim 4 wherein said haptic sensations have a magnitude directly proportional to said amplitude of said played sound data.

6. A method as recited in claim 4 wherein said haptic sensations have a magnitude inversely proportional to said amplitude of said played sound data.

7. A method as recited in claim 1 wherein said haptic sensations are output only when features of said sound data having predetermined characteristics are played.

8. A method as recited in claim 7 wherein said predetermined characteristics include a rise in amplitude of said sound data over a predetermined threshold.

9. A method as recited in claim 8 wherein said predetermined characteristics include a drop in amplitude of a predetermined amount following said rise in amplitude.

10. A method as recited in claim 7 wherein said predetermined characteristics include a minimum time interval that must occur between two peaks in amplitude to allow a haptic sensation to be output when the second of said peaks is played.

11. A method as recited in claim 1 further comprising filtering said sound data such that undesired frequencies of sound generated by said sound data are removed and a desired range of frequencies remain.

12. A method as recited in claim 11 wherein said desired range of frequencies are associated with a particular type of haptic sensation.

13. A method as recited in claim 1 wherein one of said haptic commands is generated and a haptic sensation output if a marker that was previously stored for a particular location in said sound data is reached during said playing of said sound.

14. A method as recited in claim 1 further comprising storing a portion of said sound data in a secondary buffer and processing said portion of said sound data to find said one or more characteristics in said sound data real-time during said playing of said sound data.

15. A method as recited in claim 1 further comprising displaying a visual representation of said sound data and a moving cursor to indicate a current part of said sound data that is being played.

16. A method for pre-processing sound data to allow haptic sensations associated with said sound data to be output when said sound data is played to a user, the method comprising:

loading at least a portion of said sound data into a memory of a computer, said sound data describing a sound waveform;

processing said sound data to find a sound feature having one or more predetermined characteristics; and when said sound feature is found, storing a marker in a list of markers, wherein said marker indicates a location of said associated sound feature in said sound data, said location to be associated with at least one haptic sensation such that when said sound data is played, said associated at least one haptic sensation is output to a user when said marker is reached during said playing of said sound data.

17. A method as recited in claim 16 wherein said one or more predetermined characteristics include a rise in amplitude of said sound waveform described by said sound data, said rise in amplitude being over a predetermined threshold amplitude.

18. A method as recited in claim 16 wherein said one or more predetermined characteristics include a drop in amplitude of a predetermined amount following said rise in amplitude.

19. A method as recited in claim 16 wherein said one or more predetermined characteristics include a minimum time interval that must occur between two peaks in amplitude of said sound waveform to allow a haptic sensation to be output when the second of said peaks is played.

20. A method as recited in claim 16 wherein said processing of said sound data includes filtering said sound data such that undesired frequencies of said sound data are removed.

21. A method as recited in claim 16 further comprising storing an indication of one or more particular haptic sensations that are to be associated with a particular one of said markers.

22. A method as recited in claim 21 wherein a type of said one more particular haptic sensations is based on said one or more predetermined characteristics of said sound feature to which said particular marker refers.

23. A computer readable medium including program instructions for performing steps that associate haptic sensations with sound data to assist in navigating through and editing said sound data, the steps comprising:

loading at least a portion of said sound data into a memory of a computer;

playing said sound data such that an audio signal is generated and used for outputting audio sound from an audio device, wherein said playing of said sound is controlled by user input received by said computer from a user for navigation of said sound data; and generating haptic commands based on said sound data, said haptic commands used to output haptic sensations to said user by a haptic feedback device manipulated by said user and in communication with said computer, said haptic sensations corresponding to one or more characteristics of said sound data to assist said user in discerning features of said sound data during said navigation through and editing of said sound data.

24. A method as recited in claim 23 wherein said user can control a speed of said playing of said sound data.

25. A method as recited in claim 23 wherein said user can control a direction of said playing of said sound data, said direction including forward and reverse.

26. A method as recited in claim 23 wherein said haptic sensations are continuously output during said playing of said sound data, and wherein an output haptic sensation has a magnitude based on an amplitude of said sound data currently being played.

27. A method as recited in claim 23 wherein said haptic sensations are output only when features of said sound data having predetermined characteristics are played.

28. A method as recited in claim 23 wherein one of said haptic commands is generated and a haptic sensation output if a marker that was previously stored for a particular location in said sound data is reached during said playing of said sound.

29. A method as recited in claim 23 further comprising storing a portion of said sound data in a secondary buffer and processing said portion of said sound data to find said one or more characteristics in said sound data real-time during said playing of said sound data.

* * * * *